United States Patent

Wagner et al.

[11] 4,036,433
[45] July 19, 1977

[54] THERMALLY OPERATED CONTROL DEVICE AND METHOD OF MAKING THE SAME

[75] Inventors: Joseph P. Wagner; Byron L. Jackson, both of Knoxville, Tenn.

[73] Assignee: Robertshaw Controls Company, Richmond, Va.

[21] Appl. No.: 629,291

[22] Filed: Nov. 6, 1975

[51] Int. Cl.² ............................................. G05D 23/02
[52] U.S. Cl. ........................................ 236/100; 236/86; 251/11; 60/527; 137/625.26
[58] Field of Search .................... 251/11; 137/625.26, 137/625.67; 60/527, 530; 236/100, 86, 87

[56] References Cited

U.S. PATENT DOCUMENTS

| | | | |
|---|---|---|---|
| 2,694,415 | 11/1954 | Dillon | 236/100 X |
| 3,131,563 | 5/1964 | Britton | 60/527 |
| 3,168,353 | 2/1965 | Horowitz | 137/625.26 X |
| 3,180,150 | 4/1965 | Horne | 236/100 X |
| 3,381,469 | 5/1968 | Schwartz | 60/527 |
| 3,738,571 | 6/1973 | Elmer | 236/100 |
| 3,841,551 | 10/1974 | Ota | 60/527 X |

FOREIGN PATENT DOCUMENTS 220,660   4/1962   Austria ........................... 137/625.67

Primary Examiner—Arnold Rosenthal
Attorney, Agent, or Firm—Candor, Candor & Tassone

[57] ABSTRACT

A thermally operated control device having a housing provided with a chamber divided into two sections by a flexible diaphragm and with thermally expansible material filling one of the sections to act on one side of the diaphragm and with a plunger disposed in the other of the sections and having one end thereof abutting the other side of the diaphragm to be moved thereby, the chamber sections being substantially of the same size adjacent the opposed sides of the diaphragm and the one end of the plunger substantially filling its respective section adjacent its side of the diaphragm to minimize the deformation and stretching of the diaphragm as the material forces the diaphragm into the plunger section upon expansion of the material.

12 Claims, 5 Drawing Figures

THERMALLY OPERATED CONTROL DEVICE AND METHOD OF MAKING THE SAME

This invention relates to a thermally operated control device and to a method of making the same.

It is well known that thermally operated control devices have been provided wherein each has a housing means provided with a chamber divided into two sections by a flexible diaphragm and with thermally expansible material filling one of the sections to act on one side of the diaphragm and with a plunger disposed in the other of the sections and having one end thereof abutting the other side of the diaphragm to be moved thereby. For example, see the U.S. Pat. No. to Vernet, 2,924,975 and the U.S. Pat. No. to Ota, 3,841,551.

It is a feature of this invention to provide a thermally operated control device of the above type wherein deformation and stretching of the diaphragm is substantially minimized.

For example, one embodiment of this invention provides a thermally operated control device of the above type wherein the two chamber sections are substantially of the same size adjacent to the opposed sides of the diaphragm and the one end of the plunger that engages the diaphragm substantially fills the chamber section adjacent its side of the diaphragm to minimize the deformation and stretching of the diaphragm as the thermally expansible material forces the diaphragm into that plunger section upon expansion of the material.

Accordingly, it is an object of this invention to provide a thermally operated control device having one or more of the novel features set forth above or hereinafter shown or described.

Another object of this invention is to provide an improved method of making the thermally operated control device or the like, the method of this invention having one or more of the novel features set forth above or hereinafter shown or described.

Other objects, uses, and advantages of this invention are apparent from a reading of this description which proceeds with reference to the accompanying drawing forming a part thereof and wherein.

Figure 1:
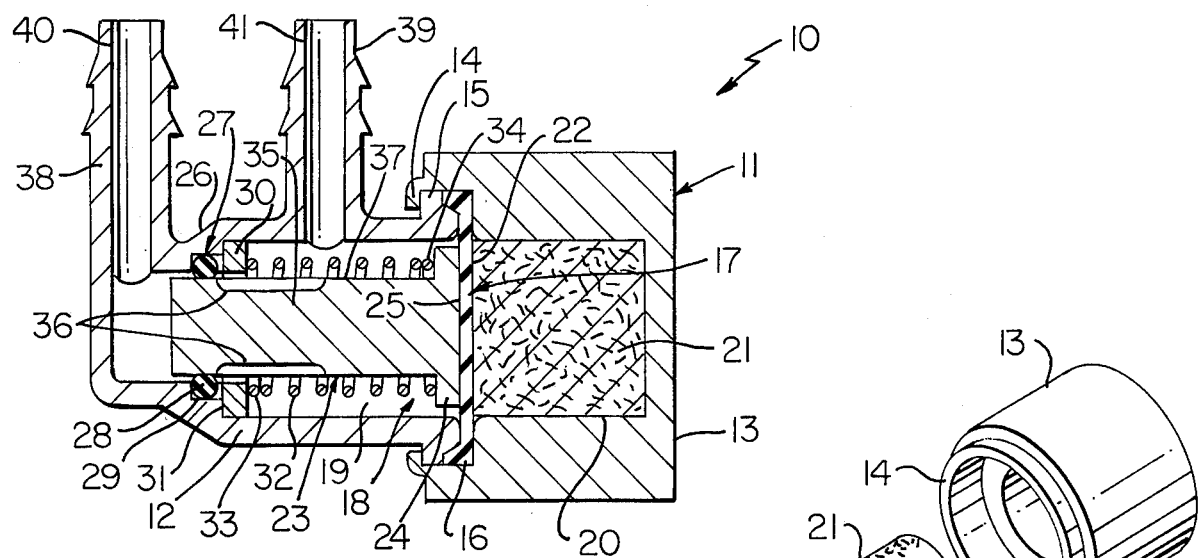
FIG. 1 is a cross-sectional view illustrating one embodiment of the thermally operated control device of this invention.

While the various features of this invention are hereinafter described and illustrated as being particularly adapted to provide a thermally operated control device that operates a valving arrangement, it is to be understood that the various features of this invention can be utilized singly or in any combination thereof to provide a control device for operating other structure as desired.

Therefore, this invention is not to be limited to only the embodiment illustrated in the drawings, because the drawings are merely utilized to illustrate one of the wide variety of uses of this invention.

Figure 3:
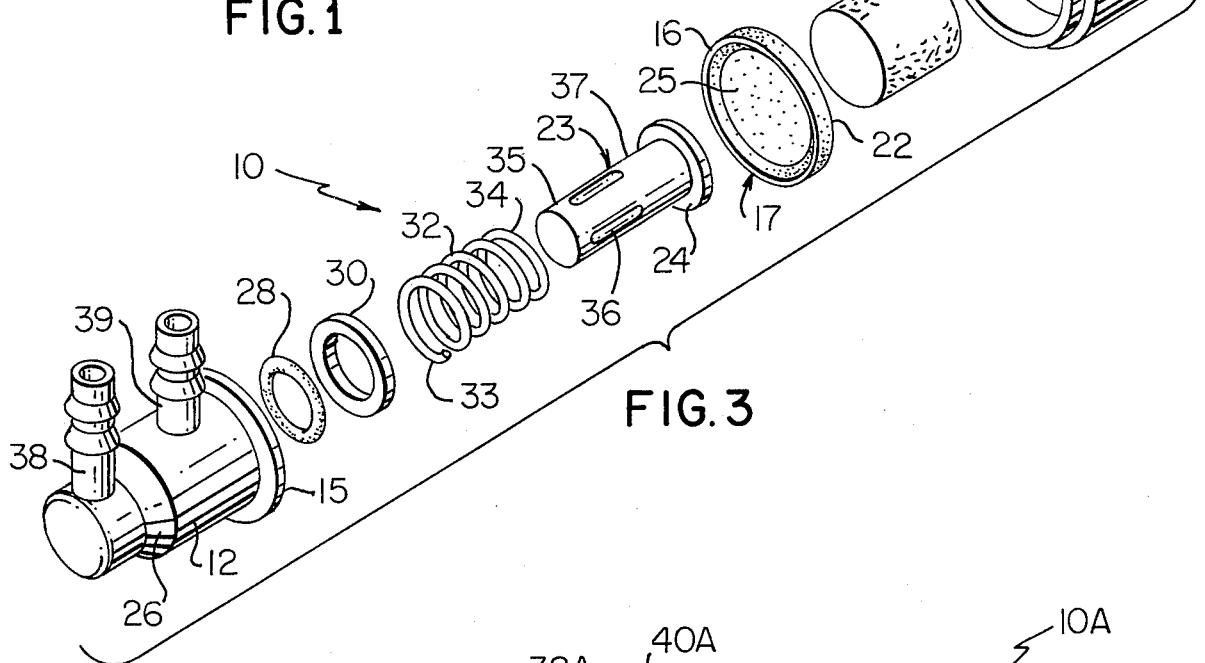
FIG. 3 is an exploded perspective view of the parts of the thermally operated control device of FIG. 1.
Figure 2:
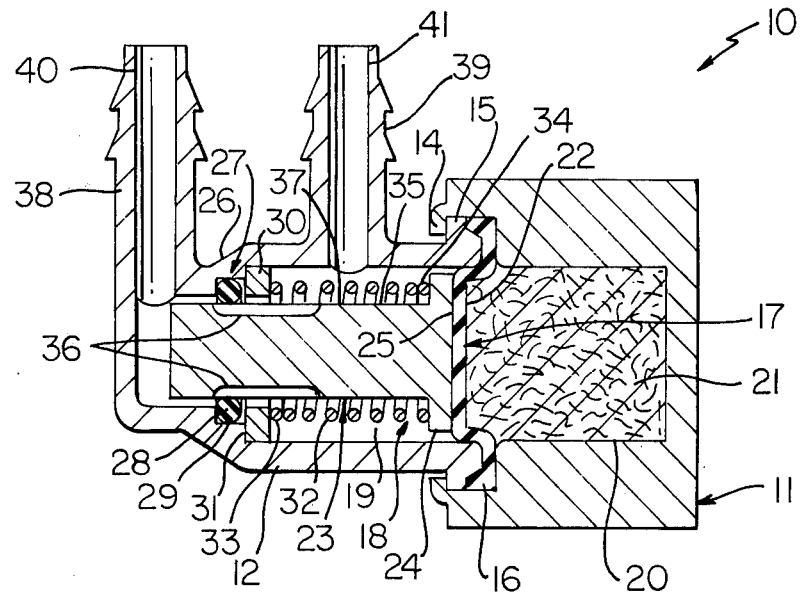
FIG. 2 is a view similar to FIG. 1 and illustrates the thermally operated control device of FIG. 1 in another operating condition thereof.

Referring now to FIGS. 1-3, one embodiment of the improved thermally operated control device of this invention is generally indicated by the reference numeral 10 and comprises a housing means 11 formed from two housing parts 12 and 13 secured together by having an open end 14 of the housing part turned over an outwardly directed flange 15 at an adjacent open end of the housing part 12, an outer peripheral portion 16 of a flexible diaphragm 17 being secured between the housing parts 12 and 13 to divide a chamber 18 thereof into two chamber sections 19 and 20.

A thermally expansible material 21, such as wax or other conventional material, completely fills the chamber section 20 so as to engage against the side 22 of the flexible diaphragm 17.

A plunger 23 is disposed in the chamber section 19 and has an enlarged disc-shaped end 24 disposed against the side 25 of the flexible diaphragm 17 so as to be moved by movement of the flexible diaphragm 17 in a manner hereinafter described.

The chamber sections 19 and 20 of the housing parts 12 and 13 are so constructed and arranged that the same are substantially cylindrical in configuration and are respectively disposed in coaxial aligned relation and of substantially the same diameter adjacent the flexible diaphragm 17 as illustrated, the disc-like end 24 of the plunger 23 being circular in configuration and substantially filling the chamber section 19 adjacent the side 25 of the diaphragm 17 for a purpose hereinafter described.

The housing part 12 has a necked-in portion 26 that defines a valve seat means 27 formed from a resilient angular O-ring 28 received in a recess 29 of the housing part 12 and held in place by a retaining ring 30 urged against an annular shoulder 31 of the housing part 12 by a compression spring 32 having one end 33 bearing against the retaining ring 30 and the other end 34 bearing against the disc-shaped end 24 of the plunger 23.

In this manner, not only does the compression spring 32 maintain the O-ring 28 in place to form the valve seat means 27, but also the force of the compression spring 32 tends to maintain the end 24 of the plunger 23 against the side 25 of the flexible diaphragm 17 so the plunger 23 will follow movement of the diaphragm 17 relative to the housing means 11 in a manner hereinafter described.

The plunger 23 has a reduced cylindrical body portion 35 extending medially to the left of the disc-shaped end 24 thereof as illustrated in FIGS. 1 and 3 and is provided with a plurality of longitudinal grooves 36 about the other periphery 37 thereof whereby the grooves 36 cooperate with the valve seat means 27 to form part of a valve member means for controlling the valve seat 27 in a manner hereinafter described.

The outer peripheral surface 37 of the plunger 23 is so constructed and arranged that the same is sealingly and slidingly disposed through the O-ring 28 as illustrated so that when the grooves 36 are out of bridging relation with the O-ring 28, the plunger 23 seals closed the opening through the O-ring 28 as illustrated in FIG. 1 and when the plunger 23 has been moved to the left as illustrated in FIG. 2, the grooves 36 bridge the O-ring 28 to thereby open the opening through the O-ring 28 for a purpose hereinafter described.

The housing part 12 is provided with a pair of outwardly extending nipples 38 and 39 which respectively have passages 40 and 41 passing therethrough and respectively interconnecting with the chamber section 19 of the housing part 12 on opposite sides of the valve seat means 27 whereby when the valve seat means 27 is sealed closed by the plunger 23 in the manner illustrated in FIG. 1, fluid interconnection between the passages 40 and 41 of the nipples 38 and 39 is prevented whereas when the grooves 36 of the plunger 23 are bridging the O-ring 28 as illustrated in FIG. 2, the passages 40 and 41 of the nipples 38 and 39 are fluidly interconnected together.

Thus, it can be seen that the thermally operated control device 10 of this invention can be formed of a relatively few parts that can be assembled together in a relatively simple manner as illustrated in FIG. 3 to operate in a manner now to be described.

Assuming that the thermally expansible material 21 has been chosen so that the same will normally be of the volume size illustrated in FIG. 1 as along as the temperature thereof is below a predetermined temperature, the flexible diaphragm 17 as illustrated in FIG. 1 is in an unstretched condition across the chamber sections 19 and 20 and the force of the compression spring 32 is maintaining the plunger 23 in such a position that the grooves 26 are out of bridging relation with the O-ring 28 of the valve seat means 27 so that fluid interconnection between the passages 40 and 41 of the housing means 11 is prevented by the closed valve seat means 27.

However, when the temperature being sensed by the material 21 increases above the predetermined temperature thereof, the material 21 expands in the manner illustrated in FIG. 2 and acts against the side 22 of the flexible diaphragm 17 to flex the same to the left and into the chamber section 19 to thereby move the plunger 23 to the left in opposition to the force of the compression spring 32 in such a manner that the grooves 36 of the plunger 23 now bridge the opening through the O-ring 28 of the valve seat means 27 to fluidly interconnect the passages 40 and 41 together.

Thus, the valve seat means 27 remains open in the manner illustrated in FIG. 2 as long as the temperature of the material 21 is above the predetermined temperature thereof. However, when the temperature of the material 21 falls below the predetermined temperature, the material 21 contracts in the manner illustrated in FIG. 1 whereby the force of the compression spring 32 moves the plunger 23 back to the right to thereby close the valve seat means 27 and prevent fluid communication between the passages 40 and 41 as illustrated in FIG. 1.

Accordingly, it can be seen that the material 21 causes opening and closing of the valve seat means 27 depending upon the temperature of the material 21.

It has been found according to the teachings of this invention that since the diameters of the chamber sections 19 and 20 adjacent the opposed sides 25 and 22 of the flexible diaphragm 17 are of the same size, substantially the entire diaphragm 17 is being utilized for motion transmitting purposes and since the disc-like part 24 of the plunger 23 substantially fills the section 19 adjacent the side 25 of the flexible diaphragm 17, the flexible diaphragm 17 cannot be forced between the plunger 23 and the housing part 12 upon expansion of the material 21 whereby the diaphragm 17 has the maximum surface area thereof in engagement with the disc-like end 24 of the plunger 23 so that deformation and stretching of the diaphragm 17 is substantially minimized.

Therefore, it can be seen that one unique feature of this invention is the making of the chamber sections 19 and 20 to be substantially of the same size adjacent the diaphragm 17 and making the plunger 23 with its end 24 substantially filling the housing section 19 adjacent the diaphragm 17 whereby the life of the diaphragm 17 is substantially increased because the same will not deform or stretch to an adverse degree during expansion of the thermally expansible material 21 as would be the case if the plunger 23 only engaged a small area of the diaphragm 17.

While the thermally operated control device 10 previously described only controls one valve seat, it is to be understood that the control device 10 of this invention could control a plurality of valve seats, if desired.

Figure 4:
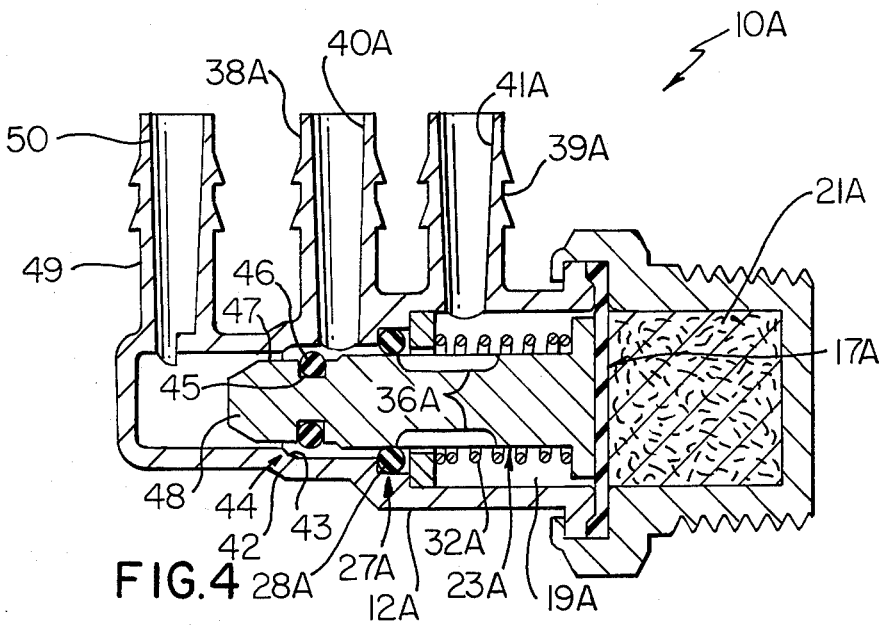
FIG. 4 is a view similar to FIG. 1 and illustrates another embodiment of the thermally operated control device of this invention.
Figure 5:
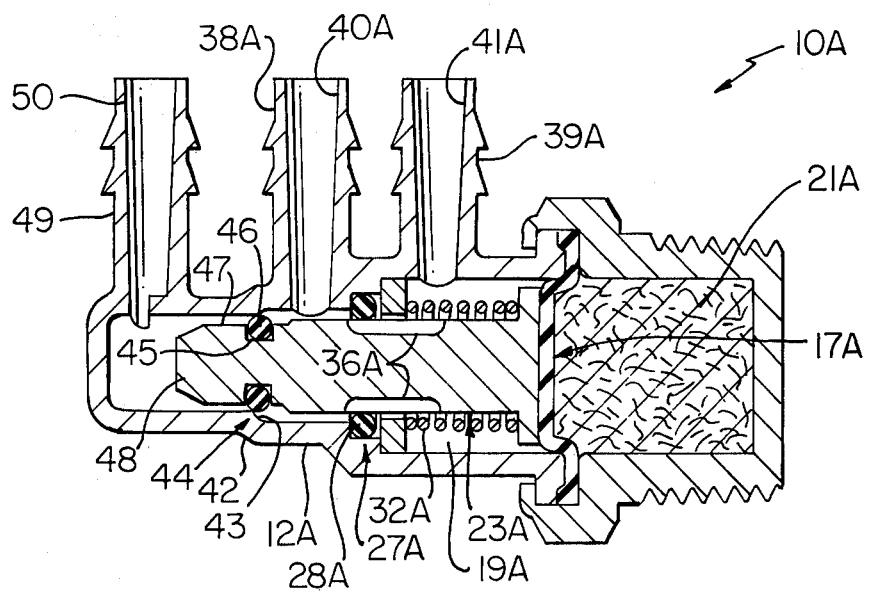
FIG. 5 is a view similar to FIG. 4 and illustrates the thermally operated control device of FIG. 4 in another operating condition thereof.

For example, reference is now made to FIGS. 4 and 5 where another thermally operated control device of this invention is generally indicated by the reference numeral 10A and parts thereof similar to the parts of the control device 10 previously described are indicated by like reference numerals followed by the reference letter A.

It can be seen that the control device 10A is substantially identical to the control device 10 previously described except that the housing part 12A has a second necked-in part 42 that defines a shoulder 43 which forms a second valve seat means 44 axially spaced to the left of the first valve seat means 27A thereof as illustrated in FIG. 4.

The plunger 23A of the control device 10A has an angular groove 45 to the left of the grooves 36A thereof and has an angular O-ring disposed therein and extending outwardly from the outer peripheral surface 47 of a reduced cylindrical extension 48 of the plunger 23A whereby the O-ring 46 acts as a valve member for closing against the valve seat surface 42 of the valve seat means 44 in the manner illustrated in FIG. 5.

The nipple 38A has its passage 40A intersecting with the chamber section 19A to the right of the valve seat surface 43 as illustrated in FIG. 4 while another nipple 49 of the housing part 12A has its passage 50 interconnecting with the chamber section 19A to the left of the valve seat surface 43 for a purpose now to be described.

When the thermally expansible material 21A of the control device 10A is at a temperature below its predetermined temperature, the diaphragm 17A is in its normal position illustrated in FIG. 4 whereby the force of the compression spring 32A maintains the plunger 23A in such a position that the grooves 36A are out of bridging relation with the O-ring 28A of the valve seat means 27A so that fluid communication between the passages 40A and 41A of the nipples 38A and 39A is prevented. However, at this position of the plunger 23A, the O-ring 46 of the plunger 23A is spaced from the surface 43 of the valve seat means 44 whereby fluid communication is provided between the passages 40A and 50 of the nipples 38A and 49 as illustrated in FIG. 4.

When the material 21A of the control device 10A is sensing the predetermined temperature thereof or higher, the material 21A has expanded in the manner illustrated in FIG. 5 to move the diaphragm 17A to the left so that the plunger 23A is moved to the left in opposition to the force of the compression spring 32A to cause the O-ring 46 to be sealed against the surface 43 of the valve seat means 44 to prevent fluid communication between the passages 40A and 50 of the nipples 38A and 49 while the grooves 36A now bridge the opening through the O-ring 28A to permit fluid communication between the passages 40A and 41A of the nipples 38A and 39A as illustrated in FIG. 5.

Thus, it can be seen that fluid communication of the passage 40A of the nipple 38A is now switched from the nipple 39 to the nipple 39A when the material 21A expands to the condition illustrated in FIG. 5.

Subsequently, should the temperature of the material 21A drop below the predetermined temperature thereof to cause the material 21A to contract in the manner illustrated in FIG. 4, the valve seat means 44 is opened and the valve seat means 27A is closed by the plunger 23A as illustrated in FIG. 4 whereby the passage 40A of the nipple 38A is switched from the nipple 39A back to the nipple 39 as illustrated.

Thus, it can be seen that the plunger of the thermally operated device of this invention can have a series of valve member means thereon to cooperate with a series of valve seat means while the diaphragm will still operate in the manner previously described to act on a large surface of the plunger to minimize deformation and stretching of the diaphragm during operation of the thermally operated control device of this invention.

Therefore, it can be seen that this invention not only provides an improved thermally operated control device, but also this invention provides an improved method of making such a thermally operated control device or the like.

While the forms and methods of this invention now preferred have been described and illustrated as required by the Patent Statute, it is to be understood that other forms and method steps can be utilized and still fall within the scope of the appended claims.

What is claimed is:

1. In a thermally operated control device having a housing means provided with a chamber divided into two sections by a flexible diaphragm and with thermally expansible material filling one of said sections to act on one side of said diaphragm and with a plunger disposed in the other of said sections and having one end thereof abutting the other side of said diaphragm to be moved thereby, the improvement wherein said sections are substantially of the same size adjacent said sides of said diaphragm and wherein said one end of said plunger substantially fills said other section adjacent said other side of said diaphragm to minimize the deformation and stretching of said diaphragm as said material forces said diaphragm into said other section upon expansion of said material, said housing means including two parts secured together with said diaphragm having an outer peripheral means secured between said parts and a normally flat center part coplanar with said peripheral means, each housing part having a substantially cylindrical interior surface respectively defining one of said sections of said chamber, said one end of said plunger being substantially rigid and substantially disc-shaped, said plunger having a reduced substantially cylindrical body extending medially from said disc-shaped end thereof.

2. In a thermally operated device as set forth in claim 1, said housing means having valve means, said plunger having valve member means for controlling said valve seat means.

3. In a thermally operated device as set forth in claim 2, said valve seat means comprising a plurality of separate valve seats, said valve member means comprising a plurality of separate valve members for respectively controlling said valve seats.

4. In a thermally operated device as set forth in claim 2, said valve seat means comprising a resilient O-ring carried by said housing means.

5. In a thermally operated device as set forth in claim 4, said valve member means comprising a plurality of grooves in said plunger for bridging said O-ring to open said valve seat means.

6. In a thermally operated device as set forth in claim 2, said valve seat means comprising a necked-in portion of said housing means, said valve member means comprising a resilient O-ring carried by said plunger for engaging against said necked-in portion to close said valve seat means.

7. In a method of making a thermally operated control device having a housing means provided with a chamber divided into two sections by a flexible diaphragm and with thermally expansible material filling one of said sections to act on one side of said diaphragm and with a plunger disposed in the other of said sections and having one end thereof abutting the other side of said diaphragm to be moved thereby, the improvement comprising the steps of forming said sections to be substantially of the same size adjacent said sides of said diaphragm, forming said one end of said plunger to substantially fill said other section adjacent said other side of said diaphragm to minimize the deformation and stretching of said diaphragm as said material forces said diaphragm into said other section upon expansion of said material, forming said housing means from two parts secured together with said diaphragm having an outer peripheral means secured between said parts and a normally flat center part coplanar with said peripheral means, forming each housing part with a substantially cylindrical interior surface respectively defining one of said sections of said chamber, forming said one end of said plunger of substantially rigid material and in substantially a disc-shape, and forming said plunger with a reduced substantially cylindrical body extending medially from said disc-shaped end thereof.

8. In a method of making a thermally operated device as set forth in claim 7, the additional steps of forming said housing means with valve seat means and forming said plunger with valve member means for controlling said valve seat means.

9. In a method of making a thermally operated device as set forth in claim 8, the additional steps of forming said valve seat means from a plurality of separate valve seats, and forming said valve member means from a plurality of separate valve members for respectively controlling said valve seats.

10. In a method of making a thermally operated device as set forth in claim 8, the additional step of forming said valve seat means from a resilient O-ring carried by said housing means.

11. In a method of making a thermally operated device as set forth in claim 10, the additional step of forming said valve member means from a plurality of grooves in said plunger for bridging said O-ring to open said valve seat means.

12. In a method of making a thermally operated device as set forth in claim 8, the additional steps of forming said valve seat means from a necked-in portion of said housing means, and forming said valve member means from a resilient O-ring carried by said plunger for engaging against said necked-in portion to close said valve seat means.

* * * * *